Dec. 12, 1967 G. G. VITT, JR 3,358,184

SWEEP LINEARIZATION SYSTEM FOR CATHODE RAY TUBE-OPTICAL DATA SCANNER

Filed Oct. 16, 1964 2 Sheets-Sheet 1

INVENTOR.
GEORGE G. VITT,
BY
Paul M. Coble
ATTORNEY

INVENTOR.
GEORGE G. VITT,
BY
Paul M. Coble
ATTORNEY.

3,358,184
Patented Dec. 12, 1967

3,358,184

SWEEP LINEARIZATION SYSTEM FOR CATHODE RAY TUBE-OPTICAL DATA SCANNER

George G. Vitt, Jr., Los Angeles, Calif., assignor to Hughes Aircraft Company, Culver City, Calif., a corporation of Delaware Filed Oct. 16, 1964, Ser. No. 404,353
6 Claims. (Cl. 315—27)

ABSTRACT OF THE DISCLOSURE

In the disclosed system, light emitted by the scanning spot on the screen of a cathode ray tube, the sweep of which is driven from a series of integrated and smoothed reference pulses, traverses a Ronchi ruling to produce a series of feedback pulses indicative of the Ronchi ruling scan velocity. The duration of the reference pulses is varied in accordance with a control signal produced by phase comparing the reference and feedback pulses to vary the rate of change of the cathode ray tube sweep such that the scan velocity of the light across the Ronchi ruling and across a data bearing medium is maintained constant.

This invention relates to cathode ray tube-optical data scanning systems, and more particularly relates to a feedback system of this type which automatically corrects for nonlinearities in the cathode ray tube sweep and in the optical focusing elements to provide a constant velocity scan in the image plane of the optical system.

In many data processing systems incorporating a cathode ray tube and optical elements for data scanning and transmission, it is imperative that the cathode ray tube sweep be adjusted such that the velocity of the image of the cathode ray tube scanning spot in the image plane of the optical system be a linear function of time in order to insure accurate reconstruction of data contained in the image plane. However, certain nonlinearities are present in the cathode ray tube sweep drive circuitry, in the cathode ray tube itself, and in the optical devices used for transmitting and focussing the cathode ray tube scanning spot which necessitate correction of the cathode ray tube sweep if accurate data reproduction is to be afforded.

In the past, nonlinearities in cathode ray tubes and their associated electronic and optical elements have been measured either by observing the position of the cathode ray tube spot image on a measuring microscope, or by transmitting the spot image through a grating and observing the time relationship of the resultant video signals on a timer-controlled monitoring oscilloscope. Once the degree of nonlinearity has been determined, the cathode ray tube sweep drive system is adjusted in an attempt to compensate for the measured nonlinearities and thereby provide a linear sweep in the image plane. Such a procedure is not only involved and time consuming, but the nonlinearity testing and adjusting steps may have to be repeated each time any of the system components undergo significant changes due to temperature or aging effects.

Accordingly, it is an object of the present invention to provide a sweep control system for a cathode ray tube-optical data scanner which automatically affords a data scanning sweep which is a linear function of time.

It is a further object of the present invention to provide a data-scanning system employing a cathode ray tube and optical elements which not only measures and displays nonlinearity errors in the cathode ray tube and its associated electronic and optical elements, but which also automatically corrects such errors regardless of changes in component characteristics.

It is a still further object of the present invention to provide apparatus for measuring nonlinearity errors associated with a cathode ray tube-optical data scanner more simply, accurately, and rapidly than has been accomplished in the past, and which apparatus affords a real-time read-out of nonlinearity errors which is readily available for recording and analysis.

It is still another object of the present invention to provide a cathode ray tube-optical system for scanning a data bearing medium at a constant velocity.

In accordance with the foregoing objects the system of the present invention includes a cathode ray tube having a display surface and electron beam deflection means for causing an electron beam to scan the display surface so that a light-emitting spot moves across a portion of the display surface. A reference signal at a predetermined frequency is used to form a deflection control signal which is applied to the electron beam deflection means of the cathode ray tube. Light emitted by the scanning spot on the display surface is directed onto a predetermined plane so that as the electron beam scans the display surface an image of the spot moves along the plane. A feedback signal is generated having a frequency indicative of the velocity of motion of the image in the predetermined plane. The phase of the feedback signal is compared with that of the reference signal, and an error signal is produced indicative of the phase difference between the reference and feedback signals. The deflection control signal is varied in accordance with the error signal such that the velocity of motion of the image in the predetermined plane is maintained constant.

In a preferred embodiment of the invention the deflection control signal varies substantially linearly at a rate determined by the duration of a series of pulses which constitute the reference signal. The duration of the reference pulses are varied in accordance with the error signal to vary the rate of change of the deflection control signal. An optical system produces from the light emitted by the scanning spot a first light beam which is employed to generate the feedback signal and a second light beam which scans the data bearing medium at a constant velocity.

The exact nature of the invention as well as other objects, advantages and characteristic features thereof will be readily apparent from consideration of the following detailed description of a preferred embodiment of the invention when taken in conjunction with the accompanying drawings in which.

Figure 1:
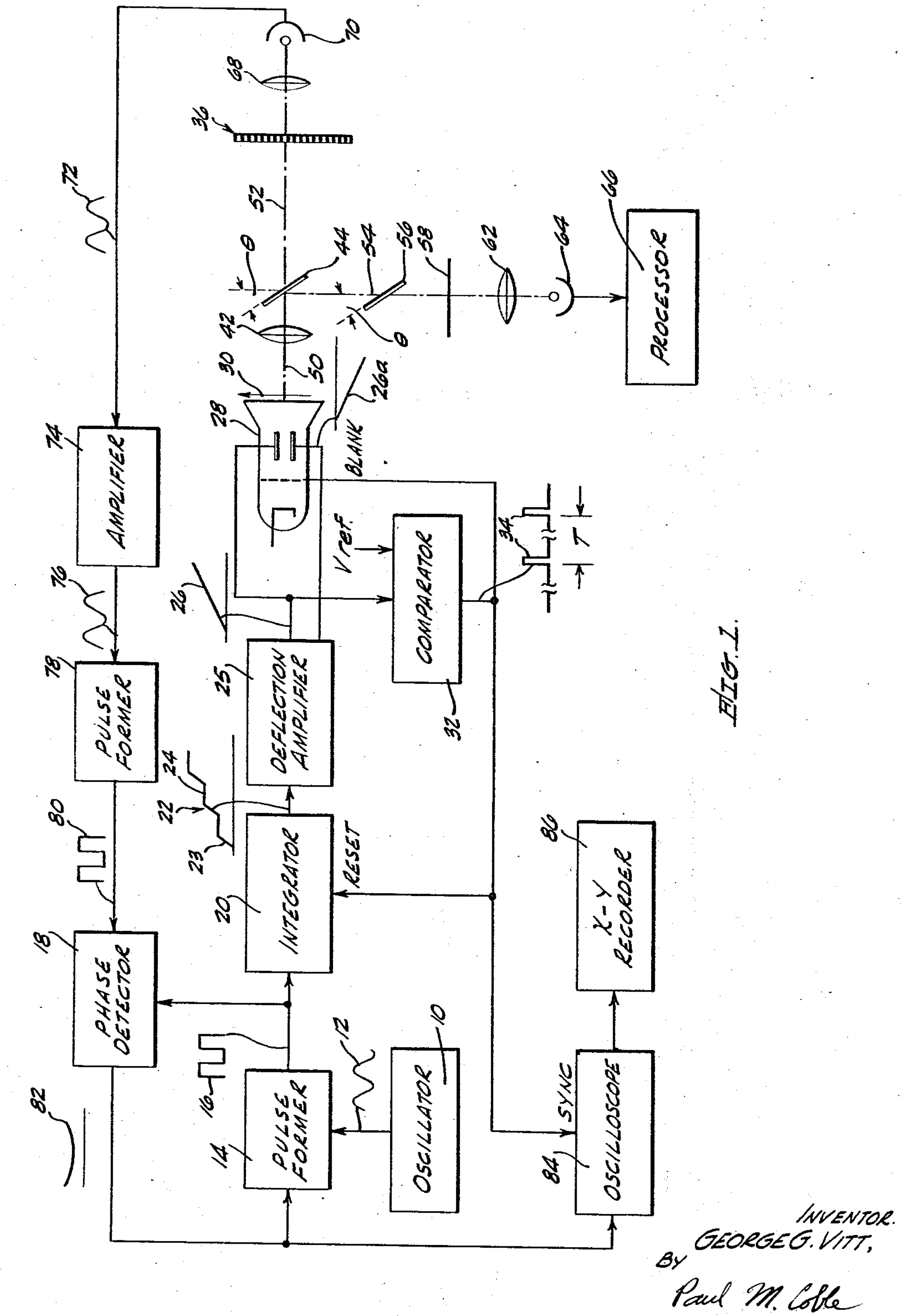
FIG. 1 is a schematic diagram, partly in block form and partly in pictorial form, illustrating a system in accordance with the present invention.

Referring to FIG. 1 with greater particularity, a cathode ray-optical data scanning system according to the present invention may be seen to include an oscillator 10 which generates a timing, or reference, signal at a predetermined frequency $f_1$. The timing signal may be a sine wave 12 having a frequency of 30 kc., for example. The oscillator 10 may be any conventional circuit which generates oscillations at the desired frequency, and an example of a particular type of circuit which may be employed is the crystal oscillator Circuit 5—5 on page 5–22 of "A Handbook of Selected Semiconductor Circuits," prepared by Transistor Applications, Inc., for the Bureau of Ships, Department of the Navy, January 1961.

The reference signal from the oscillator 10 is applied to a pulse-forming network 14 which converts the sine wave 12 into a series of rectangular pulses 16 of a constant amplitude and having a pulse repetition frequency $f_1$. An example of a circuit which may be used for the pulse-forming network 14 is a Schmitt trigger circuit of the type shown as Circuit 6–18 on page 6–63 of the aforementioned Department of the Navy publication.

The pulse train 16 from the pulse-forming network 14 is applied to one input of a phase detector 18, which will be described in more detail below, as well as to an integrator circuit 20. The integrator circuit 20 may comprise an operational amplifier with capacitive feedback, such as a Miller integrator circuit of the type shown in Fig. 18.36 on page 664 of the book "Waveforms," by Chance et al., M.I.T. Radiation Laboratory Series, vol. 19, McGraw-Hill Book Co., Inc., New York, 1949. The integrator 20 provides a voltage 22 representative of the cumulative area (volts×time) of the pulses 16. The voltage 22 takes the form of a staircase-like waveform having linearly increasing, or ramp, portions 23 coincident in time with the occurrence of the pulses 16 and essentially level portions 24 coincident in time with the absence of the pulses 16.

The output voltage 22 from the integrator 20 is applied to a deflection amplifier 25 which may be a circuit of the type shown in Fig. 10.14 on page 373 of the book "Cathode Ray Tube Displays," by Soller et al., M.I.T. Radiation Laboratory Series, vol. 22, McGraw-Hill Book Co., Inc., New York, 1948. The input circuitry for the amplifier 25 preferably contains a low pass filter in order to remove the ripple from the staircase-like waveform 22 and provide a linearly increasing, or ramp, voltage 26 at the output of the deflection amplifier 25, and which ramp voltage may be a push-pull signal as shown at 26 and 26*a*.

The amplifier output voltage 26 and 26*a*, which constitutes a deflection control voltage, is applied to one set (vertical or horizontal) of the deflection plates of a cathode ray tube 28 so that a line scan (i.e. movement of a scanning spot along a line) is produced on the screen of the tube 28 in the direction of the arrow 30. The cathode ray tube 28 may be any high resolution cathode ray tube such as a C5A16 tube manufactured by Litton Industries, Inc., Beverly Hills, Calif.

The output voltage 26 from the deflection amplifier 25 is also fed to a comparator circuit 32, for comparison with a reference voltage $V_{ref.}$ which is indicative of the maximum value to which it is desired that the ramp voltage 26 rise. The comparator 32, which may be a circuit of the type shown in Fig. 9.19 on page 342 of the aforecited "Waveforms" book, produces an output pulse 34 each time the ramp voltage 26 equals the reference voltage $V_{ref}$. The pulses 34 occur at the end of each cathode ray tube sweep interval and are used to reset the integrator 20 by discharging the integrating capacitor therein. In addition, the comparator output pulses 34 are used to interrupt the electron beam of the cathode ray tube 28 so that no image is produced during fly-back of the scan. The time required to complete one line scan on the screen of the cathode ray tube 28 may be 5 msec., for example. Thus, the period T of the reset pulses 34 would be 5 msec., giving a reset pulse repetition frequency $$f_2=\frac{1}{T}$$

of 200 cps. For the aforementioned exemplary reference frequency $f_1$ of 30 kc., 150 reference pulses 16 are provided during each line scan of the cathode ray tube 28.

Figures 2, 3:
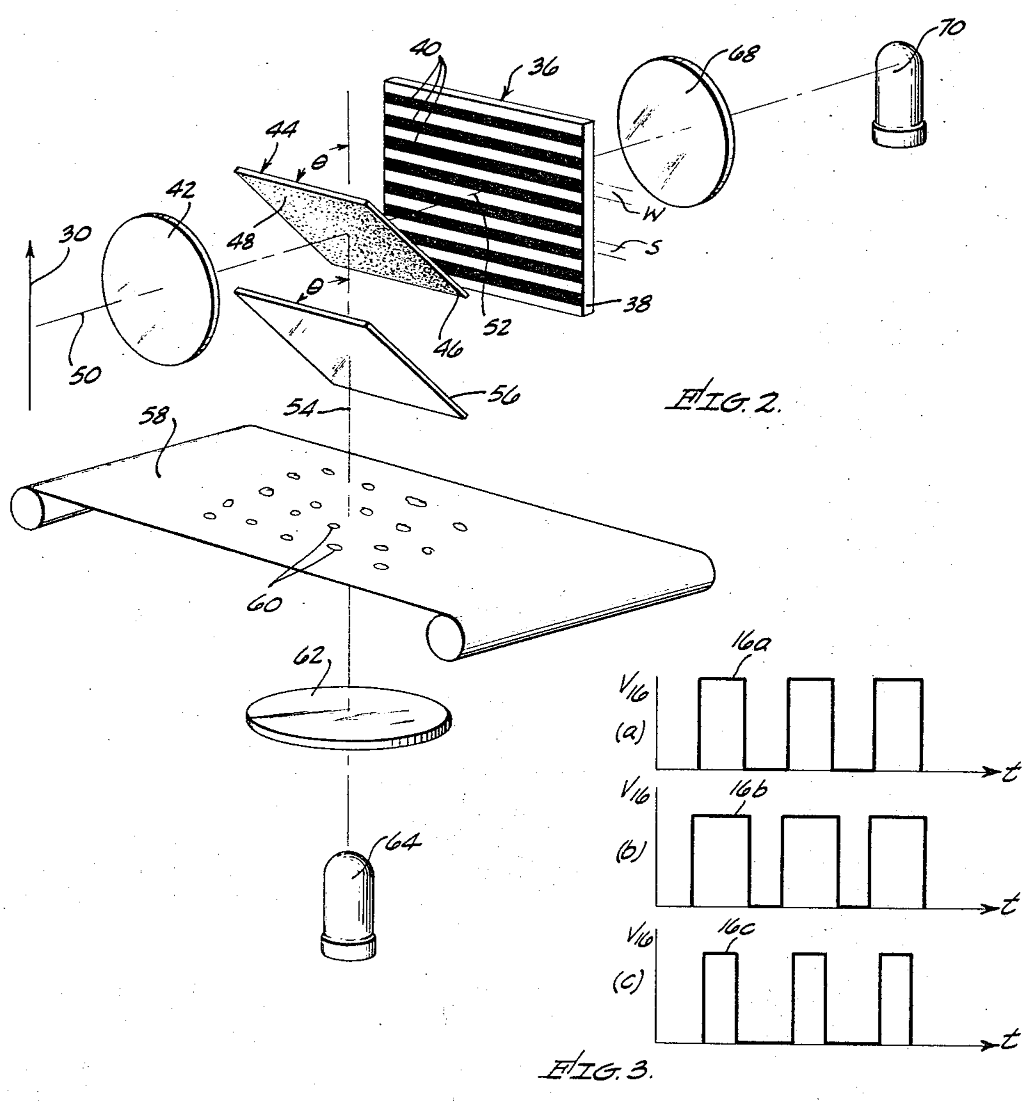
FIG. 2 is a perspective view illustrating the optical portion of the system in FIG. 1.
FIGS. 3 (*a*)–(*c*) show timing waveforms of the voltage at the input to the integrator in the system of FIG. 1.

Light emitted by the scanning spot on the screen of the cathode ray tube 28 is processed by an optical system which is shown in more detail in FIG. 2. In the optical system a light processing element 36, preferably in the form of a Ronchi ruling, is disposed in front of the screen of the cathode ray tube 28 at a fixed distance therefrom in order to intermittently transmit light emitted by the spot traversing the cathode ray tube screen. As is illustrated in FIG. 2, the ruling 36 may comprise a glass plate 38 disposed in a plane parallel to the plane of the cathode ray tube screen and having a series of opaque parallel lines 40 disposed on the broad surface of the plate 38 facing the cathode ray tube screen. The lines 40 extend in a direction perpendicular to the direction 30 of the cathode ray tube line scan so that the opaque and transparent areas of the ruling 36 alternate along the direction 30. In an exemplary embodiment of the present invention operable with the aforementioned frequencies, 150 opaque lines 40 are provided on plate 38, with the width *w* of the lines 40 and the spacing *s* between adjacent lines 40 each being .01 inch. It should be understood that different line spacings and widths may be employed so long as the reference frequency $f_1$ is selected appropriately as determined by the pitch (lines per inch) of the ruling 36 and the velocity at which the light beam scans the ruling 36.

In order to insure focussing of the cathode ray tube spot image as finely as possible on the surface of the Ronchi ruling 36, a focussing lens 42 is interposed between the ruling 36 and the screen of the cathode ray tube 28. The lens 42 may be a Tessar photographic objective lens manufactured by Bausch & Lomb Inc., Rochester, N.Y.

Interposed between the lens 42 and the Ronchi ruling 36 is a beam-splitting element 44 which divides the light 50 emitted by the cathode ray tube scanning spot into a first portion 52 which is used to generate the feedback signal for adjusting the cathode ray tube sweep and a second portion 54 for scanning the data to be processed. The beam-splitting element 44 may comprise a glass plate 46 disposed at an angle $\theta$ (of 45°, for example) with respect to the scan direction 30. A coating 48 of a reflective material such as aluminum may be evaporated onto the broad surface of the plate 46 facing the screen of the cathode ray tube 28 so that the portion 54 of the light 50 emanating from the scanning spot is reflected while the remaining portion 52 is transmitted through the plate 46. The relative amounts of reflected and transmitted light are determined by the reflectivity of the coating 48, the thickness of the coating 48, and the absorption in the glass plate 46, and although these parameters may be selected such that the transmitted and reflected portions are equal, other ratios may alternatively be employed. A correcting plate 56, which may be of clear glass, for example, is disposed parallel to the beam-splitting plate 44 in the path of the reflected light beam 54 in order to compensate for refraction in the beam-splitter 44.

A data bearing medium 58, which may be a photographic negative or the like, is disposed in the path of the light beam 54 beneath the correcting plate 56. The data bearing medium 58 and the Ronchi ruling 36 are located the same distance away from the center of the beam-splitter coating 48 so that the light beam 54 scans the data bearing medium 58 at the same velocity as that at which the light beam 52 scans the ruling 36. Information may be contained on the medium 58 in a plurality of areas 60, the "tone" or degree of transparency of which are indicative of individual items of information. The data bearing medium 58 may be moved by means (not shown) in a direction essentially perpendicular to the direction of scan of the light beam 54 so that information contained in each data area 60 is read from the medium 58 as a linear function of time. The instantaneous intensity of the light passing through the medium 58 is indicative of the stored information, and this light is directed by a condensing lens 62 onto a photodetecting device 64 which produces an electrical signal indicative of the intensity of the incident light. The condensing lens 62, which may be a number 14524–A(U/2W) lens manufactured by Burke & James, Inc., Chicago, Ill., directs as much light as possible onto the photodetector 64 which may be a Type 6291 photocell manufactured by the Allen B. Dumont Labs., Inc., Clifton, N.J., for example. The electrical signals generated by the photocell 64 are fed to any suitable data processor 66 for the desired reconstitution of the data contained on the medium 58.

Light in the beam 52 which passes through the Ronchi ruling 36 is directed by a condensing lens 68 onto a photodetecting device 70. The lens 68 and the photodetector 70 may be similar to the aforedescribed lens 62 and photocell 64, respectively. The intensity of the light energy impinging upon the photodetector 70 is a function of the position of the beam 52 with respect to the opaque lines 40 on the Ronchi ruling 36, and the photodetector 70 provides a series of electrical pulses 72 when the light beam 52 passes between the lines 40.

The pulses 72 generated by the photodetector 70 have a pulse repetition frequency $$f_3=\frac{v}{s+w}$$

where $v$ is the velocity at which the electron beam 52 moves across the Ronchi ruling 36, and $s$ and $w$ are the spacing and width, respectively, of the Ronchi ruling lines 40 as shown in FIG. 2. For the aforementioned values of sweep frequency $f_1$ and Ronchi ruling line width and spacing, and for a spot image sweep velocity amplification factor of unity between the cathode ray tube screen and the Ronchi ruling 36, the pulse repetition frequency $f_3$ of the pulses 72 is 30 kc. which is the same frequency as that of the reference pulses 16. It should be noted that although the pulses 72 ideally would possess a rectangular shape, in actuality these pulses are rounded off due to the finite cross-sectional area of the light beam incident upon and transmitted by the Ronchi ruling 36, and the waveform of the electrical signal generated by the photodetector 70 approximates a sinusoid.

The pulses 72 are amplified in a video amplifier 74, which may take the form of Circuit 4–3 shown on page 4–24 of the aforementioned Department of the Navy publication, to provide an amplified version 76 of the pulse train 72. The pulses 76 are applied to a pulse-forming network 78, which may be the same as the pulse-forming network 14, in order to convert the waveform 76 into a series of rectangular pulses 80 having the same amplitude as the reference pulses 16 from the pulse-former 14. However, the phase of the feedback pulses 80 relative to that of the reference pulses 16 varies in accordance with nonlinearities in the integrator 20, the deflection amplifier 25, the cathode ray tube 28, and the optical elements through which the light beam 50–52 passes. In order to determine the phase relationship between the pulses 80 and 16, and thereby measure the degree of departure of the Ronchi ruling scan from linearity, the phase detector 18 is employed to compare the instantaneous phase of the feedback pulses 80 with that of the reference pulses 16 and to generate a DC voltage 82 having a magnitude indicative of the instantaneous phase difference between these two series of pulses. An example of a particular circuit which may be used for the phase detector 18 in shown in Fig. 11.23 on page 413 of the aforecited book "Waveforms." When employing such a circuit the reference pulses 16 are to be applied to the "Carrier" input terminals, while the pulses 80 would be fed to the terminals labeled "Push-pull signal input."

The DC output voltage 82 from the phase detector 18 is applied to the pulse-forming network 14 to adjust the trigger level of pulse-former 14 in accordance with the voltage 82. If Circuit 6–18 in the aforementioned Department of the Navy publication is used for the pulse-forming network 14, the phase detector output voltage 82 would be fed to the trigger level adjusting potentiometer $R_2$ in Circuit 6–18. By varying the trigger level of the pulse-forming network 14, the duration of the pulses 16 from the pulse-forming network 14 is altered. The overall slope of the ramp voltage 22 (and hence the deflection control voltage 26 and 26a for the cathode ray tube 28) is thus varied by an amount such that the velocity at which the cathode ray tube spot image moves across the Ronchi ruling 36 is maintained constant.

The output voltage 82 from the phase detector 18 is a signal representative of the sweep error for the system and may be monitored and/or recorded to facilitate analysis and system adjustment. Thus, as in shown in FIG. 1, the phase detector output voltage 82 may be applied to a monitoring cathode ray oscilloscope 84 having its sweep synchronized in time with the sweep of the cathode ray tube 28 by feeding the reset pulses 34 from the comparator 32 to the sync input of the oscilloscope 84. A sampling X–Y recorder 86 may also be included to provide a graphic record of the display on the oscilloscope 84.

The operation of the data scanning system of the present invention will now be discussed with reference to the waveforms illustrated in FIG. 3. When the cathode ray tube spot image traverses the Ronchi ruling 36 at the desired constant velocity, the feedback pulses 80 derived from the photodetector 70 will lag (or lead) the reference pulses 16 provided by the pulse-forming network 14 by a predetermined phase angle $\varphi_0$. The phase detector output voltage 82 then assumes a value which sets the trigger level of the pulse-forming network 14 such that the duration of the pulses 16 is constant and, for example, equal to one-half the pulse period. Thus, as is shown in FIG. 3(a), the output voltage $V_{16}$ from the pulse-former 14 assumes the shape of the waveform 16a. The pulses 16a are integrated by the integrator 20 to produce the staircase-like ramp voltage 22, the overall slope of which is proportional to the duration of the pulses 16a. After being smoothed and amplified in the deflection amplifier 25, the ramp voltage is applied to the deflection plates of the cathode ray tube 28 to cause the electron beam to scan the cathode ray tube screen at a velocity which produces the desired constant velocity scan of the Ronchi ruling 36.

If the velocity of the spot image scanning the Ronchi ruling 36 becomes too slow, the pulses 80 derived from the photodetector 70 will lag the reference pulses 16 by a phase angle $\varphi>\varphi_0$, and the phase detector 18 will provide an output voltage 82 of a magnitude indicative of the phase difference $\varphi-\varphi_0$. The voltage 82 now applied to the trigger level adjustment for the pulse-former 14 is such that the duration of the pulses 16 is increased by an amount proportional to the change in the magnitude of the phase detector output voltage 82. Thus, the output voltage $V_{16}$ from the pulse-former 14 assumes the waveform 16b of FIG. 3(*b*). The ramp voltage 22 generated by the integrator 20 is able to rise more rapidly for the integrator input waveform 16b than for the waveform 16a, and hence the slope of the deflection control voltage 26 and 26a applied to the deflection plates of the cathode ray tube 28 is increased. Thus, the velocity at which the scanning spot moves across the screen of the cathode ray tube 28 (and hence the velocity at which the spot image traverses the Ronchi ruling 36), is increased by an amount necessary to reduce the phase angle between the pulses 16 and 80 to $\varphi_0$, and which amount provides the necessary increase in spot image velocity so that the desired constant sweep velocity in the plane of the Ronchi ruling 36 is attained.

If the velocity of motion of the spot image in the plane of the Ronchi ruling 36 increases excessively so that the phase angle between the reference pulses 16 and the feedback pulses 80 becomes less than $\varphi_0$, the output voltage 82 from the phase detector 18 biases the trigger input to the pulse-forming network 14 such that the duration of the pulses 16 is decreased as shown by the waveform 16c of FIG. 3(*c*). The slope of the ramp voltage 26 and 26a applied to the deflection plates of the cathode ray tube 28 is thus reduced, resulting in a decrease in the velocity at which the cathode ray tube spot image traverses the Ronchi ruling 36 by an amount necessary to return the phase angle between the pulses 16 and 80 to $\varphi_0$ and thereby attain the desired sweep velocity for the spot image traversing the Ronchi ruling 36.

It will thus be apparent that the feedback signal derived from the optical portion of the system of the present invention acts to regulate the cathode ray tube sweep in a manner which insures that the velocity of the cathode ray tube spot image in the plane of the Ronchi ruling 36 is constant. Moreover, since the respective light beams 52 and 54 which scan the Ronchi ruling 36 and the data bearing medium 58 are both derived from the same light beam 50 emitted by the cathode ray tube scanning spot, and since the Ronchi ruling 36 and the data bearing medium 58 are equi-distant from the beam dividing point, the light beam 54 scans the data bearing medium at the same velocity as that at which the light beam 52 scans the Ronchi ruling 36. Thus, a constant velocity scan is also achieved for the data bearing medium 58. In addition, any nonlinearities in the system may be displayed on the monitoring oscilloscope 84 on a real-time basis while these nonlinearities are automatically being corrected and while the system is reading information from the data bearing medium 58.

Although the present invention has been shown and described with respect to a particular embodiment, it is pointed out that various changes and modifications which are obvious to a person skilled in the art to which the invention pertains are deemed to lie within the spirit, scope, and contemplation of the invention as set forth in the appended claims.

What is claimed is:

1. A scanning system comprising: means for generating a series of first pulses at a predetermined repetition frequency, means for integrating said first pulses to produce a signal which varies substantially linearly at a rate determined by the duration of said first pulses, a cathode ray tube having a display surface and electron beam deflection means for causing an electron beam to scan a portion of said surface so that a light-emitting spot moves across said surface, means for applying said linearly varying signal to said electron beam deflection means, means for directing light emitted by said spot onto a predetermined plane so that as said electron beam scans said display surface an image of said spot moves along said plane, means for generating a series of second pulses having a repetition frequency indicative of the velocity at which said image moves along said plane, means for comparing the phase of said first and second pulses and for producing a control signal indicative of the phase difference therebetween, and means for varying the duration of said first pulses in accordance with said control signal to vary the rate of change of said linearly varying signal such that the velocity at which said image moves along said plane is maintained constant.

2. A scan linearization system comprising: means for generating a series of first pulses at a predetermined repetition frequency, integrating means for deriving from said first pulses a deflection control signal which varies substantially linearly at a rate determined by the duration of said first pulses, a cathode ray tube having a display surface and electron beam deflection control means for causing an electron beam to scan a portion of said surface so that a light-emitting spot moves across said surface, means for applying said deflection control signal to said electron beam deflection control means, means for directing light emitted by said spot onto a predetermined plane so that as said electron beam scans said display surface an image of said spot moves along said plane, means for deriving from the movement of said image along said plane a series of second pulses having a repetition frequency substantially equal to said predetermined frequency but having an instantaneous frequency deviation from said predetermined frequency in accordance with any nonlinearity in the movement of said image along said plane as a function of time, means for comparing the instantaneous phase of said first and second pulses and for producing a DC control signal indicative of the instantaneous phase difference therebetween, and means for varying the duration of said first pulses in accordance with said DC control signal to vary the rate of change of said deflection control signal such that the movement of said image along said plane is a linear function of time.

3. A scanning system comprising: means for generating a series of first pulses at a predetermined repetition frequency, integrating means for deriving from said first pulses a deflection control voltage which varies substantially linearly from a predetermined level at a rate determined by the duration of said first pulses, a cathode ray tube having a display surface and electron beam generating and deflecting means for causing an electron beam to scan a portion of said surface so that a light-emitting spot moves across said surface in a time interval substantially longer than the pulse period corresponding to said predetermined frequency, means for directing light emitted by said spot onto a predetermined plane so that as said electron beam scans said display surface an image of said spot moves along said plane, means for applying said deflection control voltage to said electron beam deflecting means, means for comparing said deflection control voltage with a reference voltage indicative of said time interval and for generating a reset signal when said deflection control voltage equals said reference voltage, means for applying said reset signal to said integrating means to return said deflection control voltage to said predetermined level, means for applying said reset signal to said electron beam generating means for temporarily interrupting said electron beam, means for deriving from the movement of said image along said plane a series of second pulses having a repetition frequency substantially equal to said predetermined frequency and indicative of the instantaneous velocity at which said image moves along said plane, means for comparing the instantaneous phase of said first and second pulses and for producing a control signal indicative of the instantaneous phase difference therebetween, and means for varying the duration of said first pulses in accordance with said control signal to vary the rate of change of said deflection control voltage such that the velocity at which said image moves along said plane is maintained constant.

4. A system for scanning a data bearing medium at a constant velocity comprising: means for generating a series of first pulses at a predetermined repetition frequency, means for integrating said first pulses to produce a signal which varies substantially linearly at a rate determined by the duration of said first pulses, a cathode ray tube having a display surface and electron beam deflection means for causing an electron beam to scan a portion of said surface so that a light-emitting spot moves across said surface, means for applying said linearly varying signal to said electron beam deflection means, a light processing element spaced from said display surface and having a plurality of first and second regions alternately disposed along a predetermined direction, said first and second regions having substantially different transmissivities for light, a data bearing medium, light dividing and focussing means for producing from the light emitted by said spot first and second light beams and for directing said first and second light beams onto said light processing element and said data bearing medium, respectively, so that as said electron beam scans said display surface said first light beam scans said light processing element along said predetermined direction at a first velocity and said second light beam scans said data bearing medium at a velocity equal to said first velocity, photodetecting means for receiving light in said first light beam which passes through said light processing element as said first light beam scans said element and for converting the received light into a series of electrical pulses having a repetition frequency indicative of the velocity at which said first light beam scans said light processing element, means for comparing the phase of said first and second pulses and for producing a control signal indicative of the phase difference therebetween, and means for varying the duration of said first pulses in accordance with said control signal to vary the rate of change of said linearly varying signal such that the velocity at which said first light beam scans said light processing element and said second light beam scans said data bearing medium is maintained constant.

5. A scanning system comprising: means for generating a series of first pulses at a predetermined repetition frequency, means for integrating said first pulses to produce a signal which varies substantially linearly at a rate determined by the duration of said first pulses, a cathode ray tube having a display surface and electron beam deflection means for causing an electron beam to scan a portion of said surface so that a light-emitting spot moves across said surface, means for applying said linearly varying signal to said electron beam deflection means, means for directing light emitted by said spot onto a predetermined plane so that as said electron beam scans said display surface an image of said spot moves along said plane, means for generating a series of second pulses having a repetition frequency indicative of the velocity at which said image moves along said plane, means for comparing the phase of said first and second pulses and for producing a control signal indicative of the phase difference therebetween, means for varying the duration of said first pulses in accordance with said control signal to vary the rate of change of said linearly varying signal such that the velocity at which said image moves along said plane is maintained constant, and means for displaying said control signal in time coincidence with said scan of said display surface.

6. In a data scanner: means for generating a series of first pulses at a predetermined repetition frequency, means for integrating said first pulses to produce a signal which varies substantially linearly at a rate determined by the duration of said first pulses, a cathode ray tube having a display surface and electron beam deflection means for causing an electron beam to scan said display surface so that a light-emitting spot moves across a portion of said surface, means for applying said linearly varying signal to said electron beam deflection means, a data bearing medium, means for producing from a portion of the light emitted by said spot a light beam and for directing said light beam onto said data bearing medium so that as said electron beam scans said display surface said light beam scans said data bearing medium, means for deriving from another portion of the light emitted by said spot a series of second pulses having a repetition frequency indicative of the velocity of motion of said light beam along said data bearing medium, means for comparing the phase of said first and second pulses and for producing a control signal indicative of the phase difference therebetween, and means for varying the duration of said first pulses in accordance with said control signal to vary the rate of change of said linearly varying signal such that the velocity of motion of said light beam along said data bearing medium is maintained constant.

References Cited

UNITED STATES PATENTS

| | | | |
|---|---|---|---|
| 2,415,191 | 2/1947 | Rajchman | 250—217 |
| 2,604,534 | 7/1952 | Graham | 315—10 |
| 2,743,379 | 4/1956 | Fernsler | 315—12 |
| 2,851,521 | 9/1958 | Clapp | 250—217 |
| 2,892,960 | 6/1959 | Nuttall | 315—10 |
| 2,929,956 | 3/1960 | Jacobs | 250—217 |

ROBERT L. GRIFFIN, *Acting Primary Examiner.*

JOHN W. CALDWELL, *Examiner.*

J. A. ORSINO, *Assistant Examiner.*